April 22, 1924.
L. A. WILSON
1,491,575
COMBINED MOTION PICTURE PROJECTING APPARATUS AND SCREEN
Filed Aug. 28, 1920   4 Sheets-Sheet 2
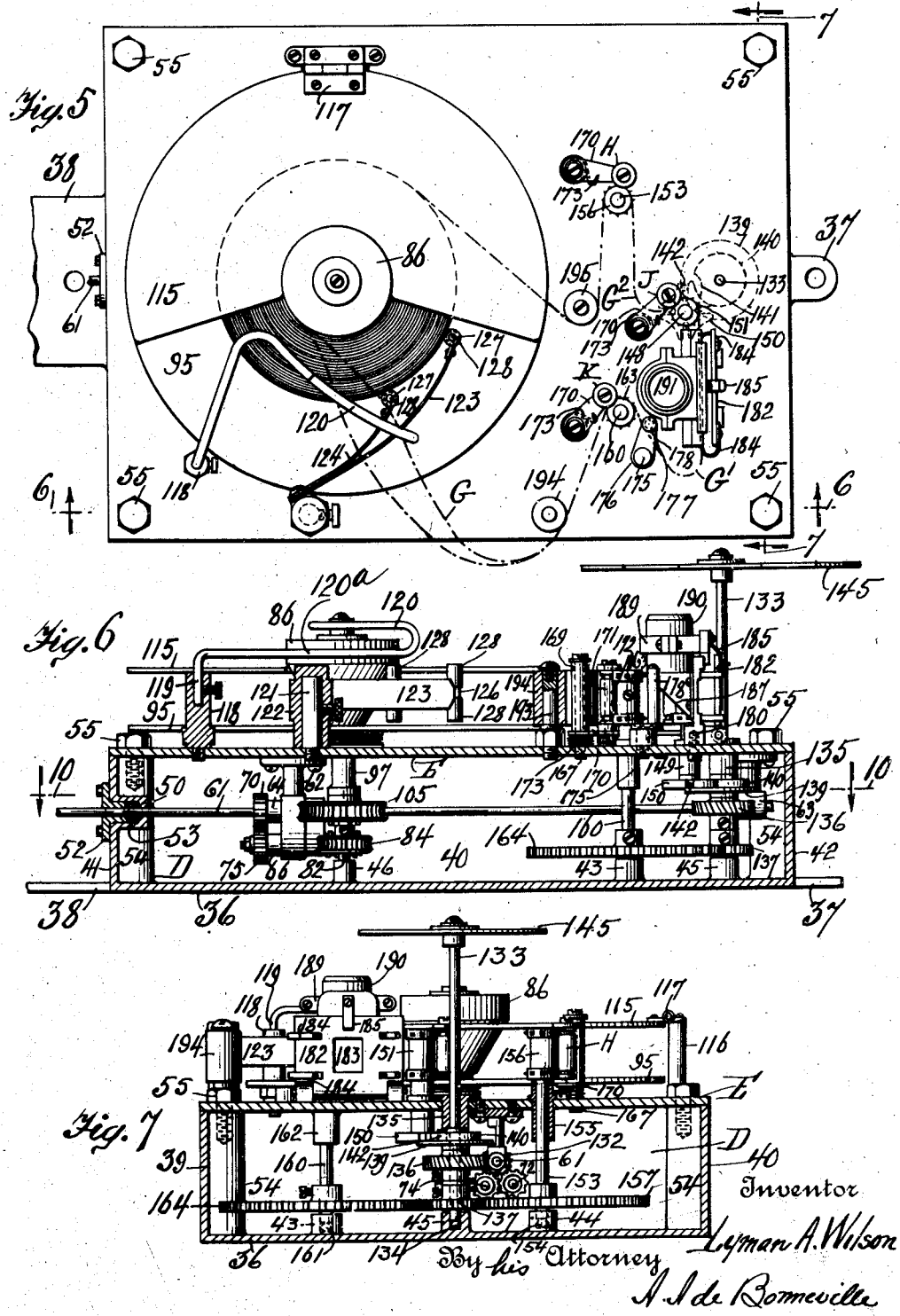
Inventor
Lyman A. Wilson
By his Attorney
A. J. de Bonneville

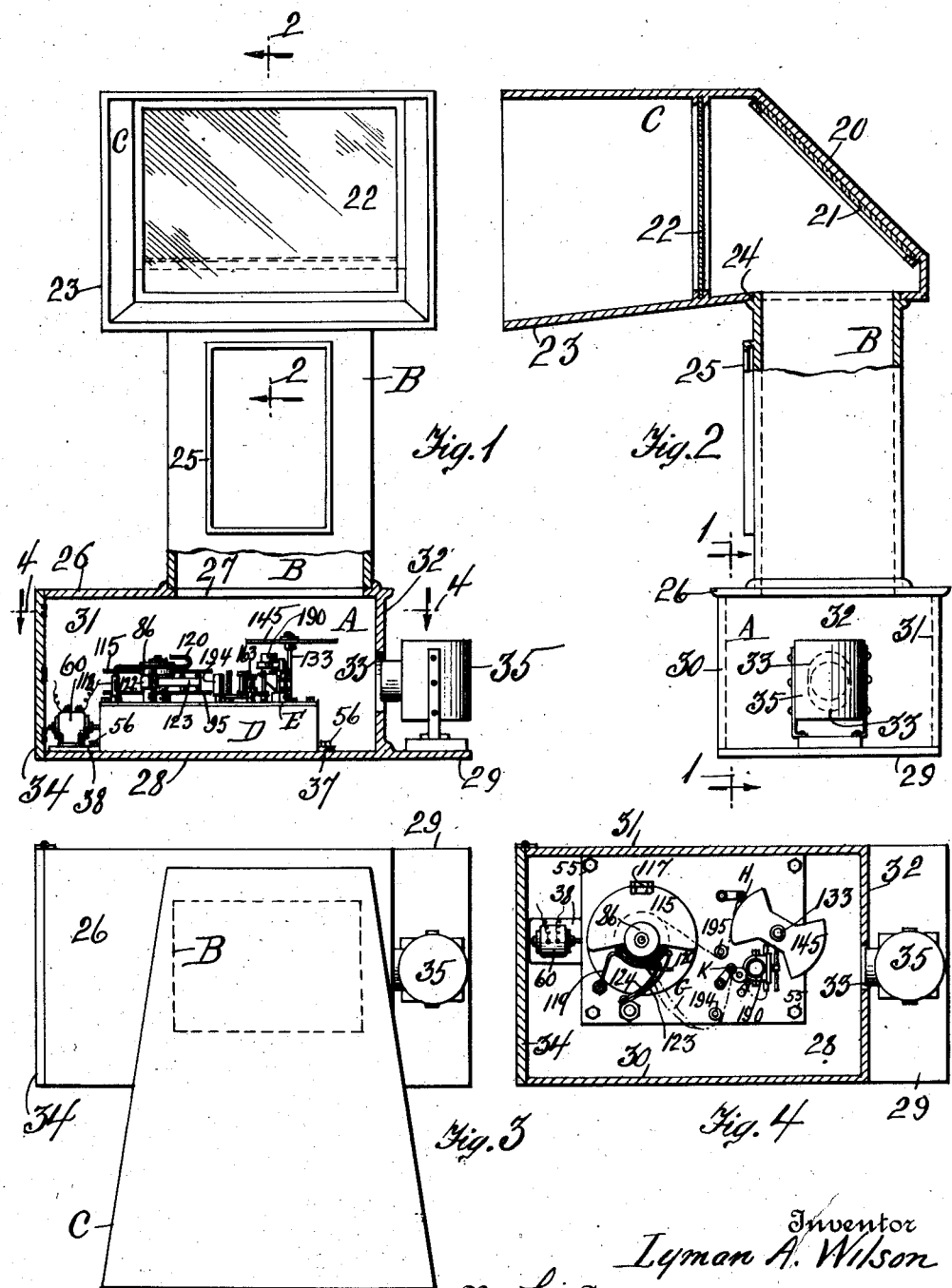

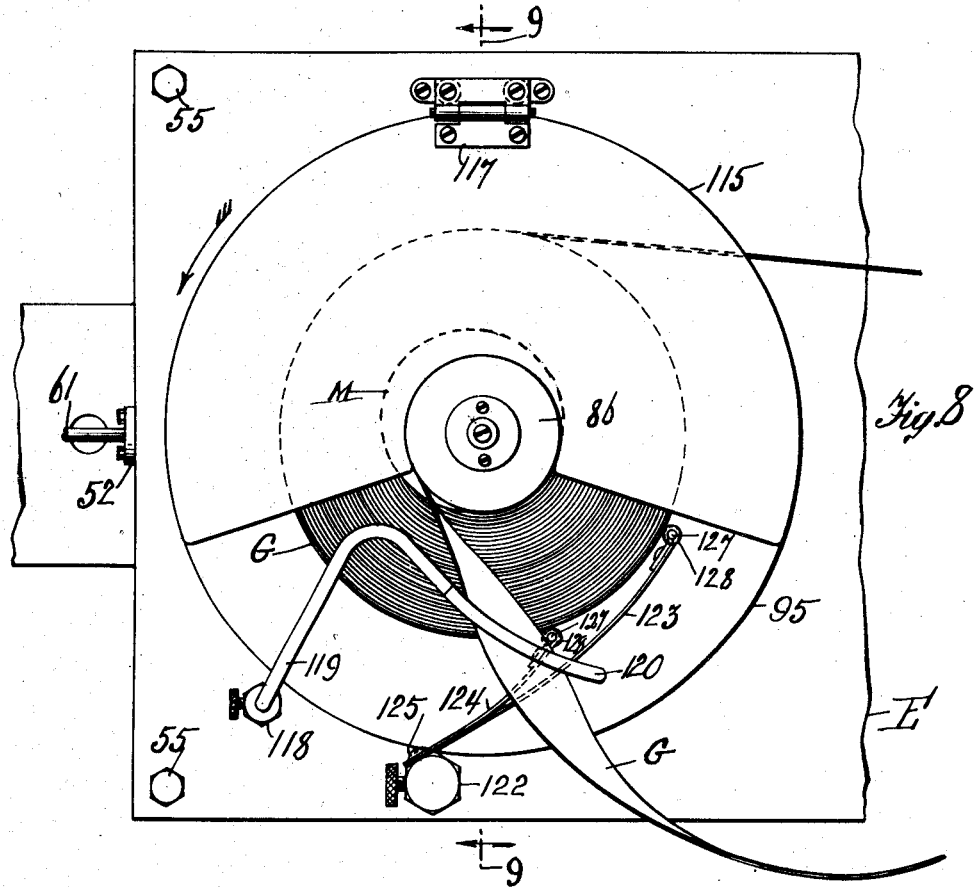
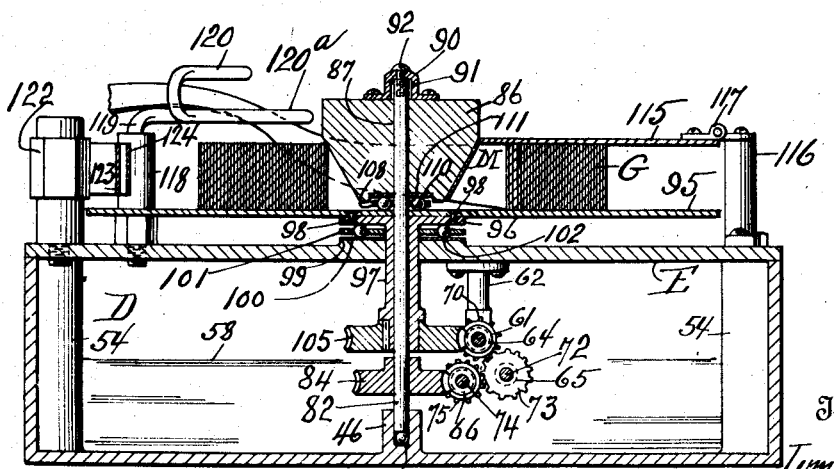

April 22, 1924.
L. A. WILSON
COMBINED MOTION PICTURE PROJECTING APPARATUS AND SCREEN
Filed Aug. 28, 1920  4 Sheets-Sheet 4
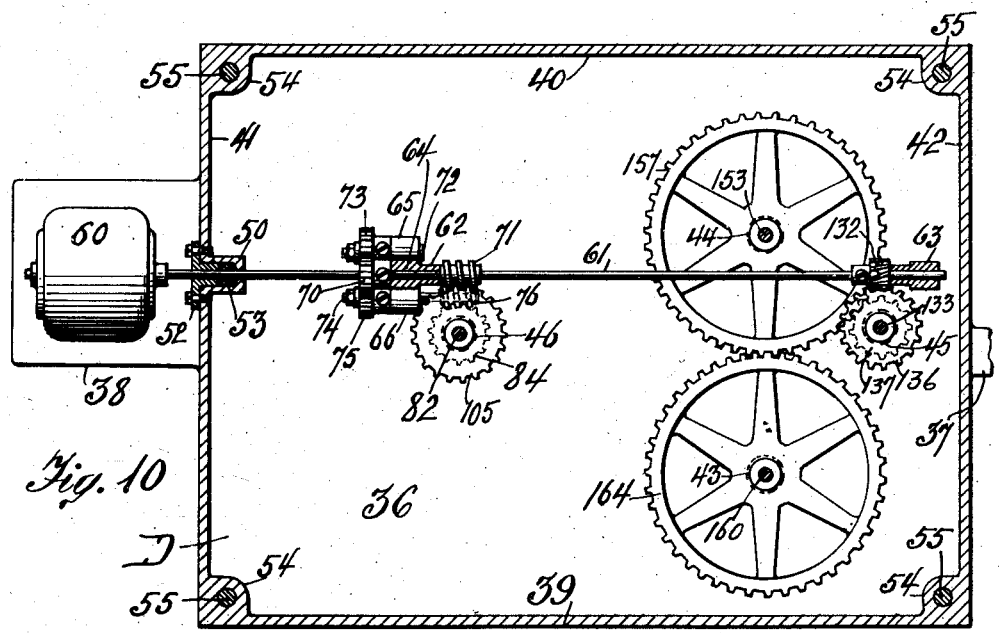
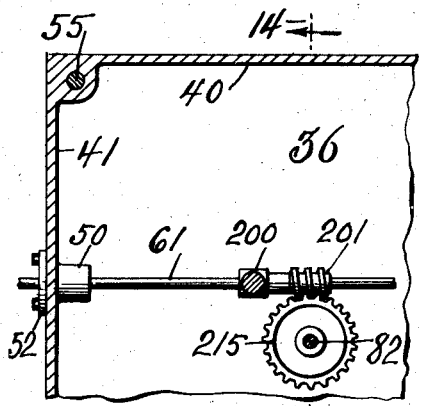
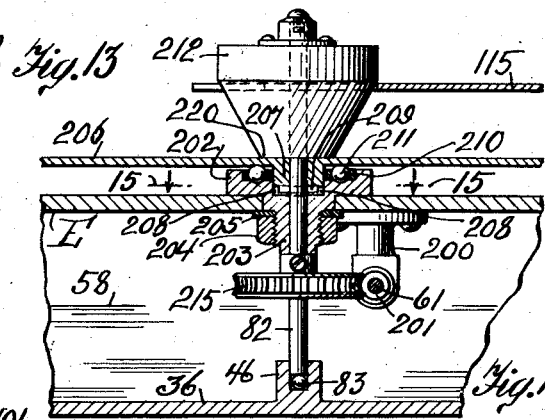
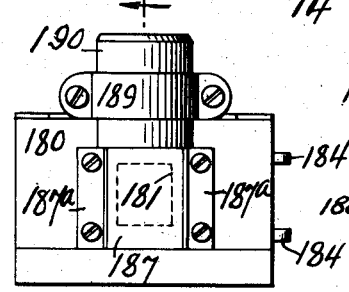
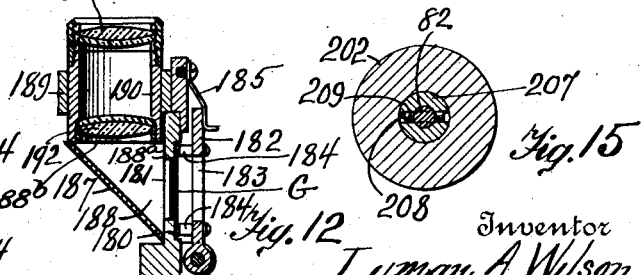
Inventor
Lyman A. Wilson
By his Attorney Patented Apr. 22, 1924.

1,491,575

UNITED STATES PATENT OFFICE.

LYMAN A. WILSON, OF NEW YORK, N. Y.

COMBINED MOTION-PICTURE-PROJECTING APPARATUS AND SCREEN.

Application filed August 28, 1920. Serial No. 406,570.

*To all whom it may concern:*

Be it known that I, LYMAN A. WILSON, citizen of the United States, and resident of the borough of Manhattan, city of New York, in the county of New York and State of New York, have invented certain new and useful Improvements in a Combined Motion-Picture-Projecting Apparatus and Screen, of which the following is a specification.

This invention relates to a combined motion picture projecting apparatus and screen. The invention has incorporated therewith the endless film reel described in my patent application Serial Number 326,215 filed September 25th, 1919. The organization of the invention comprises a housing that has contained therein the motion picture projecting apparatus with its screen. The source of power is contained within the housing and the lamp for the apparatus is connected to the housing. The apparatus and screen constitutes a portable device which can be located in store windows, and various other places for advertising, educational and many other purposes.

Fig. 1 represents a front view of the combined motion picture projecting apparatus and screen with a section as on the line 1, 1 of Fig. 2; Fig. 2 shows a partial right hand side view of Fig. 1 with a section of Fig. 1 on the line 2, 2; Fig. 3 shows a top plan view of Fig. 1; Fig. 4 represents a section of Fig. 1 on the line 4, 4; Fig. 5 represents an enlarged top plan view of the motion picture appurtenances with the shutter thereof removed; Fig. 6 shows a section of Fig. 5 on the line 6, 6; Fig. 7 represents a section of Fig. 5 on the line 7, 7; Fig. 8 shows an enlarged fragmentary portion of Fig. 5 showing the film reel and its appurtenances; Fig. 9 represents a section of Fig. 8 on the line 9, 9; Fig. 10 is a section of Fig. 6 on the line 10, 10; Fig. 11 represents a rear view of the lens holder and film guide of the apparatus; Fig. 12 is a section of Fig. 11 on the line 12, 12; Fig. 13 represents a modified form of driving appurtenances of the film reel of the apparatus; Fig. 14 shows a section of Fig. 13 on the line 14, 14 and Fig. 15 is a section of Fig. 14 on the line 15, 15.

This apparatus comprises a housing with the working chamber A, throat chamber B and the projecting chamber C. The chambers are detachably connected to each other. The projecting chamber has formed therewith a rear wall 20 inclined at an angle of forty-five degrees and to the inner face of which is connected the deflecting mirror 21. A ground glass projecting plate or screen 22 is secured in the projecting chamber C in the front of said mirror and a hood 23 extends beyond the plate 22. In the lower wall of the chamber C is an opening 24. The chamber B is located under the opening 24 of the projecting chamber C. A frame 25 for an advertising placard is provided for the front wall of the throat chamber B. The working chamber A comprises the roof 26 with the opening 27, the bottom 28 with the extension 29, the front wall 30, the rear wall 31, the end wall 32 and the opening 33 and the hinged door 34 opposite the wall 32.

A lamp 35 is supported on the extension 29 opposite the opening 33.

In the working chamber A is located the motion picture apparatus which comprises the following elements. A casing designated in its entirety by the letter D which comprises the bottom wall 36 with lugs 37 and 38, the front wall 39, the rear wall 40 and the side walls 41 and 42. Thrust bearing journal brackets 43, 44, 45 and 46 are formed with the bottom wall 36. In the side wall 41 is formed a stuffing box 50 for the gland 52 and the packing 53. Projections 54 are formed in the four corners of the casing D. A detachable cover designated in its entirely by the letter E is located upon the front and side walls of the casing D and is fastened thereto by the screws 55, which engage threaded openings in the projections 54. The bottom plate 36 is fastened to the bottom wall of the chamber A, by means of screws 56 which pass through openings in the lugs 37 and 38. Lubricating oil 58 is contained in the case D with its upper level preferably below the opening in the stuffing box 50.

An electric motor 60 is located upon and fastened to the lug 38 of the bottom wall 36. The armature shaft 61 of the electric motor extends into the casing D. A pair of journal hangers 62 and 63 extend from the cover E and support the extended portion of the armature shaft 61. The journal hanger 62 has formed at its lower end the journal bearings 64, 65 and 66 and the extended armature shaft 61 is supported in the bearing 64. On the armature shaft 61 is fastened the spur gear 70 and the worm 71. A short shaft 72 is journaled in the bearing 65 and has fastened thereto the idler gear 73. A short shaft 74 is journaled in the bearing 66 and has fastened thereto the spur gear 75 and the worm 76. The spur gear 70 meshes with and drives the idler spur gear 73 and the latter meshes with and drives the spur gear 75. A spindle 82 is journaled at its lower end in the bearing 46. A thrust ball 83 in the bearing 46 supports the lower end of the spindle 82. A worm wheel 84 is fastened to the spindle 82 and meshes with and is driven by the worm 76.

A guide cone 86 has a central axle opening 87 by means of which it is supported on the spindle 82. A cap 90 is fastened to the top face of the cone 86 and has a central opening 91 for the top end of the spindle 82. A screw 92 extends through the cap 90 and is in threaded engagement with the top end of the spindle 82.

A turntable 95 encircles the spindle 82 and has fastened to its bottom face the disc flange 96 of the sleeve 97 by means of the rivets 98. The cover E has a slight projection 99 upon which is located a disc 100 which encircles the sleeve 97. A ball bearing cage 101 encircles the sleeve 97 and is located between the disc flange 96 and the disc 100. Ball bearings 102 are provided for the cage 101. The disc flange 96 constitutes the upper ball race for the ball bearings 102 and the disc 100 constitutes the lower ball race for said ball bearings 102.

A worm wheel 105 is fastened to the lower end of the sleeve 97 and meshes with and is driven by the worm 71. The worm wheel 105 is larger in diameter than the worm wheel 84. A ball bearing cage 108 encircles the spindle 82 and is provided with the ball bearings 110 which are supported upon the turntable 95. A disc 111 is fastened in a depression in the lower face of the guide cone 86 and constitutes the upper race for the ball bearings 110, while the turntable 95 constitutes the lower race. A reel film cover 115 is hinged to a bracket 116 that extends from the cover E by means of a hinge 117. An endless motion picture film G is located upon the turntable 95 below the cover 115 and encircles the guide cone 86. The cover 115 partially covers the film G. A post 118 extends from and is supported on the cover E and has adjustably connected thereto the arm 119 of the U shaped film guide loop having the arms 120 and 120ᵃ which are parallel to each other and parallel to the turntable 95.

A post 121 extends from the cover E and has adjustably connected thereto the hexagonal cap 122. A pair of springs 123, 124 have one end each connected to the cap 122 by means of the screw 125. On the outer ends of said springs are formed eyes 126 for pins 127. Rollers 128 are journaled on the pins 127. The rollers 128 bear against the outer face of the outer winding of the film G.

A spiral gear 132 is fastened to the armature shaft 61 adjacent to the journal bracket 63. A shutter shaft 133 is journaled at its lower end in the bracket 45, and a thrust ball 134 in said bracket supports the lower end of said shutter shaft. A guide sleeve 135 is secured in the cover E for the shaft 133. A spiral gear 136 is fastened to the shaft 133 and meshes with and is driven by the spiral gear 132. At the lower portion of the shutter shaft 133 is fastened the pinion 137.

To the shaft 133 below the sleeve 135 is fastened the flange 139 having formed therewith the disc 140. The latter has formed in its circumferential edge the notch 141. A pin 142 extends up from the flange 139. A shutter 145 is fastened to the top end of the shaft 133. A shaft 148, designated as the third shaft, is journaled in a sleeve 149, similar to the sleeve 155 to be described and which is supported in the cover E.

A maltese cross 150 is fastened to the shaft 148. The pin 142 coacts with the maltese cross 150 in the usual manner. Above and rotating with the maltese cross 150 is the film sprocket wheel 151 which is fastened to the shaft 148. A shaft 153, designated as the fourth shaft, is supported in the bearing 44 at its lower end. A thrust ball 154 in said bearing supports the lower end of said shaft 153. A sleeve 155 extends through and is supported by the cover E and constitutes an upper bearing for the shaft 153. A film sprocket wheel 156 is fastened to the upper portion of the shaft 153 and is in horizontal alignment with the film sprocket wheel 151. At the lower portion of the shaft 153 is fastened the spur gear 157 which meshes with and is driven by the pinion 137.

A shaft 160, designated as the fifth shaft, is journaled at its lower end in the bearing 43. A thrust ball 161 in said bearing supports the lower end of said shaft 160. A sleeve 162 similar to 155 extends through and is supported by the cover E and constitutes an upper bearing for the shaft 160. A film sprocket wheel 163 is fastened to the upper portion of the shaft 160 and is in horizontal alignment with the film sprocket wheels 151 and 156. At the lower portion of the shaft 160 is fastened the spur gear 164 which meshes with and is driven by the spur gear 157.

Three presser rollers are indicated in their entirety by the letters H, J and K. For each of the presser rollers there extends from the cover E a post 167. A sleeve 169 is supported on the post 167 and has formed therewith the arm 170, that carries a spindle 171. A presser roller 172 is journaled on the spindle 171 in the usual manner. A spiral spring 173 has one end connected to the post 167 and its other end is fastened to the arm 170, to force the roller 172 against the film G to engage the teeth of the sprocket wheels 150, 156 and 163. A screw pivot 175 has supported thereon a sleeve 176 with an arm 177. From the latter extends a guide post 178 which is adjacent to the sprocket wheel 163 to guide the film G as it leaves the latter.

A film guide plate 180 with the opening 181 extends up from and is fastened to the cover E. The plate 180 has hinged thereto the cover 182 with the opening 183. Springs 184 extend from the cover 182 and bear against the film G when the cover is in the closed position. The said film passes between the springs 184 and the adjacent face of the cover plate 180. A spring latch 185 locks the cover 182 with the guide plate 180. A support with the inclined rear wall 187 is fastened to the brackets 187ª which in turn are fastened to the plate 180 opposite the opening 181. A 90 degrees prism 188 is supported in the said support upon the rear wall 187, one of the faces 188ª of the prism being in a vertical plane and its face 188ᵇ being in a horizontal plane. A lens bracket 189 extends from the plate 180 and supports the lens barrel 190 with the lenses 191 and 192. Posts 193 extend up from the cover E and have respectively journaled thereon the guide rollers 194 and 195.

In Figs. 13, 14 and 15 is shown a modification of the driving mechanism of the turntable and guide cone.

The armature shaft 61 in this modification has provided therefor a journal hanger 200 extending from the cover E. Adjacent to the hanger 200 there is fastened to the armature shaft 61 a worm 201. The spindle 82 is shown supported at its lower end in the journal bearing 46 with its thrust ball 83. A ball bearing race 202 has the lower threaded portion 203 for the nut 204. A washer 205 is interposed between the cover E and the nut 204. The said race 202 is clamped to the cover E by means of said nut. The turntable designated by the numeral 206 has extending therefrom the sleeve 207 having the notches 208. A pin 209 extends through the spindle 82 and engages the notches 208. A ball bearing cage 210 with the ball bearings 211 is supported upon the race 202 and encircles the sleeve 207. The guide cone 212 is journaled on the spindle 82 and bears upon the turntable 206. On the spindle 82 is fastened a worm wheel 215 which meshes with and is driven by the worm 201. The worm wheel 215 drives the spindle 82 and thereby the turntable 206 and the guide cone 212 are turned.

To operate the apparatus shown in Figs. 1 to 12 inclusive the cover 115 is raised to locate the endless motion picture film G upon the turntable 95. The film is spirally wound around the guide cone 86 after which the cover 115 is lowered in place. During the operation of the machine the film G is led from its core through the guide loops 120 and 120ª, bears against the guide roller 194 and from thence is engaged by the film sprocket wheel 163. The presser roller K maintains the film in operative contact with the sprocket wheel 163. The film G next bears against the adjustable guide post 178 and then has formed therein a loop G'. From the said loop G' the film is guided between the film guide plate 180 and the springs 184. The latter maintain the film in proper position as it travels in contact with the guide plate 180.

The film G next leads to the film sprocket wheel 151 to which it is maintained in operative contact by the presser roller J. A loop G² is then formed in the film G after which it passes over the film sprocket wheel 156 to which latter it is maintained in operative contact by the presser roller H. The film G is then led around the guide roller 195 and is spirally wound around the guide cone 86 from which it was first led.

To move the film G the electric motor 60 is started which rotates the armature shaft 61 and thereby the spur gear 70 is turned. The spur gear 70 turns the idler gear 73, which latter turns the spur gear 75 in the same direction as the spur gear 70 is turned. The shaft 74 turns with the spur gear 75 and thereby the worm 76 turns the worm wheel 84. The spindle 82 turns with the worm wheel 84 and thereby the guide cone 86 is turned and the motion picture film is discharged from its core and led through the guide loop having the arms 120 and 120ª and from thence as already described.

The springs 123 and 124 maintain the windings of the film G in eccentric relation to the guide cone 86 with a crescent shaped clearance space M between the core of the film and the said guide cone. The inclination of the wall of the guide cone and the clearance space M enables the film to make a turn or twist of ninety degrees in the body thereof, to be enabled to rise to a higher level, as it is discharged at its core and enters the guide loop.

To direct the film to a higher level with the body thereof in a vertical plane would allow it to be easily broken.

With the rotations of the spur gear 70 the worm 71 turns the worm wheel 105. The sleeve 97 turns with the worm wheel 105 and thereby the turntable 95 is turned to spirally wind the film around the guide cone 86. As the film G passes the opening 183 in the cover 182 and the opening 181 in the film guide plate 180 the normally vertical axes of the pictures on the film being in a horizontal plane the rays of light from the lamp 35 pass therethrough and impinge against the prism 188. By this means the pictures on the film are projected on the vertical face 188ª of said prism 188. From the vertical face 188ª of the prism the pictures are reflected to the horizontal face 188ᵇ thereof. From the horizontal face 188ᵇ of the prism 188 the pictures are reflected to the mirror 21 and from the latter they are reflected on the projecting plate or screen 22 to be observed through the hood 23 in their upright position.

The worm wheel 105 is larger in diameter than the worm wheel 84 whereby the guide cone 86 rotates at a greater speed than the turntable 95. By this means the outer windings of the film G travel slower than the windings at its core, and the tensions of the film at its outer and inner windings are equalized, permitting the film to evenly wind and unwind during the operations.

In the modification shown in Figs. 13, 14 and 15, the rotations of the armature shaft 61, rotates the worm 201 and the latter turns the worm wheel 215. The spindle 82, guide cone 212 and the turntable 206 turn with the worm wheel 215. In this modification the guide cone 212 at its lower face 220 is in frictional contact with the turntable which permits the guide cone to run ahead of the turntable if excessive tension is imparted to the film.

Having described my invention what I desire to secure by Letters Patent and claim is:

1. In combination a housing comprising a working chamber, a throat chamber detachably supported on the working chamber, a projecting chamber detachably supported on the throat chamber, a casing within the working chamber, lubricating oil in the casing, a motion picture projecting apparatus with a portion thereof supported on the casing and a portion thereof within the casing lubricated by the oil therein, an electric motor in chamber connected to the portion of said apparatus in the casing and a lamp for said apparatus outside of the chamber.

2. In combination, a housing comprising a working chamber, a throat chamber connected to the working chamber, a projecting chamber connected to the throat chamber, a casing within the working chamber, lubricating oil in the casing, a motion picture projecting apparatus with a portion thereof above the casing and another portion extending into the casing to be lubricated by the oil therein, said apparatus adapted to actuate an endless picture film, said film confined within the working chamber, a source of power within the chamber to actuate said apparatus and a source of light for the apparatus.

3. In combination, a working chamber, a casing within the working chamber, a throat chamber coacting with the working chamber and above the same, a projecting chamber above the throat chamber, an inclined mirror in the rear of said projecting chamber, a ground glass screen in the projecting chamber and in front of said mirror, a motion picture projecting apparatus supported on the casing, a film guide plate vertically supported above the casing and having an opening for light rays to pass through, said guide plate guiding a picture film with the normally vertical axis of the pictures in a horizontal plane, a ninety degree prism with one of its faces in a vertical plane and opposite said opening and attached to said film guide plate, a lens barrel with lenses opposite the horizontal face of the prism, the longitudinal axis of the barrel perpendicular to the horizontal face of the prism and a horizontal rotating shutter between the lens barrel and said inclined mirror.

4. In combination, a working chamber, a casing within the working chamber, a motion picture projecting apparatus supported on the casing, a film guide plate vertically supported above the casing and having an opening for light rays to pass through, the said guide plate guiding a picture film with the normally vertical axis of the pictures in a horizontal plane, a ninety-degree prism with one of its faces in a vertical plane and opposite said opening, a lens barrel with lenses opposite the horizontal face of the prism, the longitudinal axis of the barrel perpendicular to the horizontal face of the prism and an inclined deflecting mirror in the path of the light rays of the said lenses.

5. In a motion picture apparatus the combination of a film guide plate with an opening for light rays to pass therethrough and to guide a picture film with the normally vertical axis of the pictures thereon in a horizontal plane, a ninety degree prism with its light ray receiving surface opposite said opening and parallel to the face of the film, a lens barrel opposite and perpendicular to the reflecting face of said prism, a reflecting mirror with its face inclined to an angle of forty-five degrees to the latter face of the prism and a horizontal revolving shutter, between the lens barrel and said reflecting mirror.

6. In a motion picture projecting apparatus the combination of a turntable adapted to simultaneously wind and unwind an endless picture film, a rotating shaft in the apparatus, a spindle in the apparatus, gearing between the shaft and spindle to rotate the latter, a guide element for the film to discharge it at its core fastened to the spindle, means to turn the turntable independently of the said spindle, a vertical rotating shaft in the apparatus, a horizontal shutter fastened to the latter shaft, a film guide plate below and perpendicular to the plane of the shutter, a lens bracket connected to the film guide plate, a lens barrel supported in the lens bracket, lenses for the lens barrel and a guide loop in the apparatus to guide the said film as it is discharged by means of the said element at its core.

7. In a motion picture projecting apparatus the combination of a turntable for supporting and winding up an endless film, a rotating shaft in the apparatus, a spindle in the machine, transmission gearing between the shaft and spindle to rotate the latter, a guide cone for the film fastened to the spindle, a sleeve journaled on the spindle and connected to the turntable, transmission mechanism between the sleeve and rotating shaft to rotate the sleeve with said turntable at a less number of turns than the spindle with said guide cone, a shutter shaft in the apparatus, gearing between the shutter shaft and said rotating shaft to rotate the former, a third shaft journaled in the apparatus, a Geneva movement connected between the third shaft and shutter shaft, a shutter fastened to the shutter shaft, a film sprocket wheel fastened to the third shaft, a fourth shaft journaled in the apparatus, a spur gear fastened to the fourth shaft, a pinion on the shutter shaft meshing with the spur gear on the fourth shaft, a film sprocket wheel fastened to the fourth shaft, a fifth shaft journaled in the apparatus, a spur gear fastened to the fifth shaft meshing with the spur gear on the fourth shaft, a film sprocket wheel fastened to the fifth shaft, a film guide plate interposed between the third and fifth shafts, a lens bracket connected to the film guide plate, a lens with lenses supported in the lens bracket and a guide loop in the apparatus to guide the film as it is discharged from its windings at its core.

Signed at the Borough of Manhattan, city of New York, in the county of New York and State of New York, this 18th day of August A. D. 1920.

LYMAN A. WILSON.